(12) United States Patent
Furuya et al.

(10) Patent No.: US 7,200,312 B2
(45) Date of Patent: Apr. 3, 2007

(54) OPTICAL WAVEGUIDE DEVICE

(75) Inventors: Hiroyuki Furuya, Nara (JP); Akira Enokihara, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/331,086

(22) Filed: Jan. 13, 2006

(65) Prior Publication Data

US 2006/0182400 A1    Aug. 17, 2006

Related U.S. Application Data

(63) Continuation of application No. PCT/JP2005/020836, filed on Nov. 14, 2005.

(30) Foreign Application Priority Data

Nov. 15, 2004    (JP)    ............................... 2004-330214

(51) Int. Cl.
*G02B 6/10*    (2006.01)
(52) U.S. Cl. ..................... 385/129; 385/131; 385/132
(58) Field of Classification Search ................ 385/129, 385/31, 16, 43; 359/322
See application file for complete search history.

(56) References Cited

U.S. PATENT DOCUMENTS

| 6,465,742 | B1 | 10/2002 | Hiraoka et al. |
| 6,542,654 | B1* | 4/2003 | Miller et al. ................... 385/16 |
| 6,643,439 | B2 | 11/2003 | Notomi et al. |
| 6,684,008 | B2* | 1/2004 | Young et al. ................... 385/31 |
| 6,728,457 | B2 | 4/2004 | Sigalas et al. |

(Continued)

FOREIGN PATENT DOCUMENTS

JP    62-212632 A    9/1987

(Continued)

OTHER PUBLICATIONS

Costa, Martineeli, Melloni, "Ultracompact Photonic Crystal Resonant Filters", May 2002, Optical Society of America, Quantum Electronics and Laser Science Conference, QELS 2002, pp. 77-78.*

(Continued)

*Primary Examiner*—Brian Healy
*Assistant Examiner*—Guy G. Anderson
(74) *Attorney, Agent, or Firm*—McDermott Will & Emery LLP

(57) ABSTRACT

An optical waveguide device has: photonic crystal regions 305, each having holes 304 arranged in a periodic array; and an optical waveguide 302. Within the waveguide 302, high refractive index portions 303 are arranged along the waveguiding direction. Each of the high refractive index portions 303 is generally interposed between a pair of holes 304 which are in symmetric positions with respect to the center axis. The center of gravity of every high refractive index portion 303 is shifted along the waveguiding direction from a midpoint of a line interconnecting centers of the pair of holes 304, and is located between a position which is 0.45 r away from the midpoint in the waveguiding direction and a position which is 0.25 r away from the midpoint in the opposite direction, where r is a radius of each hole 304.

13 Claims, 13 Drawing Sheets

U.S. PATENT DOCUMENTS

| | | | |
|---|---|---|---|
| 6,853,791 B2 * | 2/2005 | Sigalas ........................ | 385/129 |
| 6,859,304 B2 * | 2/2005 | Miller et al. ................. | 359/322 |
| 2002/0009277 A1 | 1/2002 | Noda et al. | |
| 2004/0008945 A1 | 1/2004 | Sigalas | |
| 2004/0008962 A1 | 1/2004 | Sigalas et al. | |
| 2005/0265660 A1 * | 12/2005 | Miller .......................... | 385/43 |
| 2006/0029347 A1 * | 2/2006 | Sigalas et al. .............. | 385/129 |

FOREIGN PATENT DOCUMENTS

| | | |
|---|---|---|
| JP | 2001-272555 | 10/2001 |
| JP | 2002-350657 A | 4/2002 |
| JP | 2002-296628 A | 10/2002 |
| JP | 2004-46181 | 2/2004 |
| JP | 2005-274843 | 10/2005 |

OTHER PUBLICATIONS

Tsai, Chen, Lee, Chang, Chi, "Proposal of a novel method for reduction of propagation loss of photonic crystal waveguides." □□Dec. 2003, CLEO/Pacific Rim 2003, 5th Pacific Rim Conference on Lasers and Electro-Optics, (IEEE Cat No. 03TH8671) vol. 1, p. 324.*

U.S. Appl. No. 11/246,156, filed Oct. 11, 2005, Furuya et al.

John D., Joannopoulos, et al., "Photonic Crystals: Molding the Flow of Light," 1995, pp. 1-7, 38-53, Princeton University Press, Princeton, New Jersey.

Alongkarn Chutinan, "Waveguides and waveguide bends in two-dimensional photonic crystal slabs," Physical Review B, Aug. 15, 2000, pp. 4488-4492, vol. 62, No. 7, The American Physical Society.

* cited by examiner

*FIG.8A*
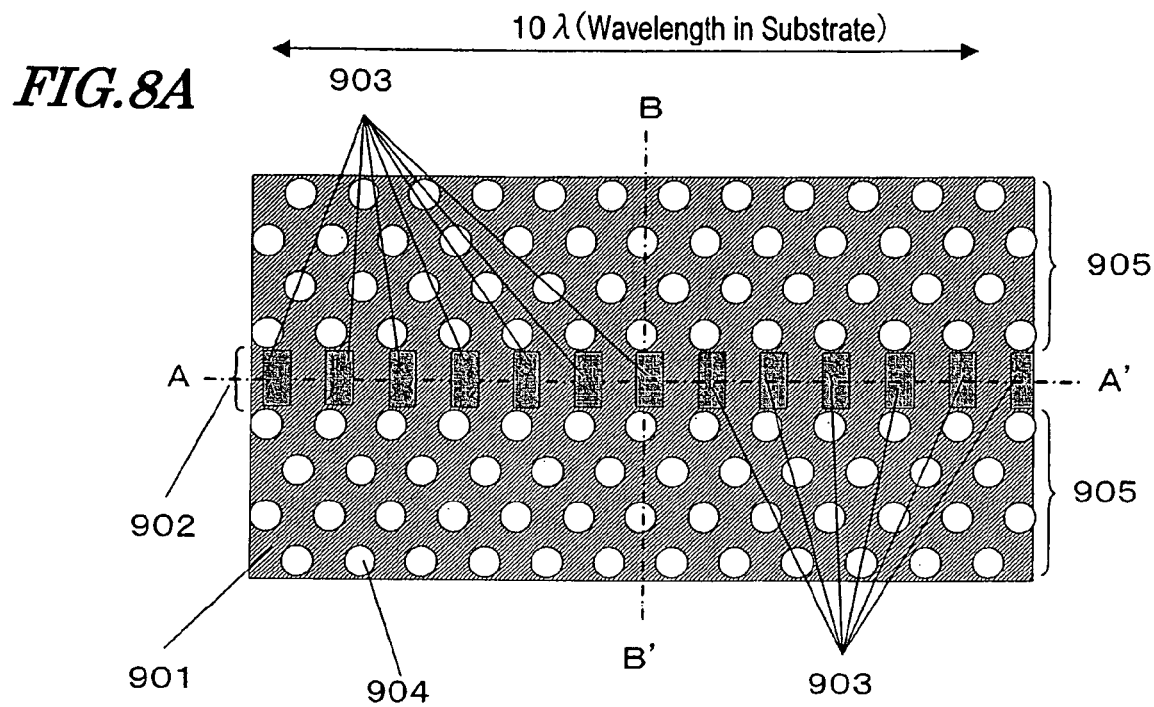
*FIG.8B*
*FIG.8C*
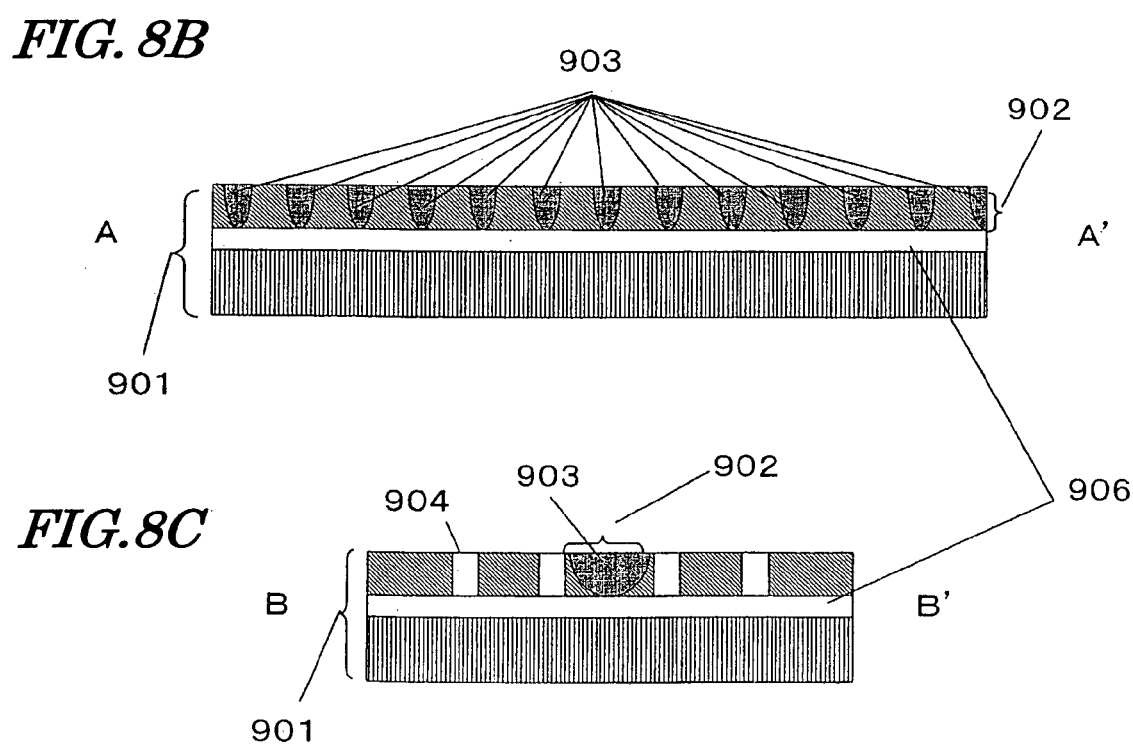

10 λ (Wavelength in Substrate)

※ Waveguide Length : 10 λ

OPTICAL WAVEGUIDE DEVICE

This is a continuation of International Application PCT/JP2005/020836, with an international filing date of Nov. 14, 2005, which in turn claims the benefit of Japanese Application No. 2004-330214, filed on Nov. 15, 2004, the disclosures of which Applications are incorporated by reference herein.

BACKGROUND OF THE INVENTION

1. Field of the Invention

The present invention relates to an optical waveguide device having a photonic crystal structure.

2. Description of the Related Art

It is known that, when a structure whose refractive index is modulated with a period on the order of a light wavelength is formed in a substrate of a material which is capable of transmitting electromagnetic waves (including light), e.g., a dielectric or semiconductor, a band structure, which is similar to an electronic band structure in a crystal, will appear in the dispersion relation for propagation of electromagnetic waves. Such a band with respect to electromagnetic waves (typically "light") is referred to as a photonic band, and a periodic structure which has a photonic band is referred to as a "photonic crystal". A known photonic crystal is described in J. D. Joannopouls et al. "Photonic crystals", Princeton University Press, 1995.

Optical waveguide devices utilizing photonic crystals are regarded as being a promising technique for downsizing optical circuit devices. What is important in an optical waveguide device in which photonic crystals are used to confine light in a predetermined region is the difference in refractive index between an optical waveguide portion and photonic periodic structures. Therefore, there have been reported examples of combining a material whose refractive index is three or more, e.g., gallium arsenide (refractive index: 3.6) or silicon (refractive index: 3.4), and a low refractive index material, e.g., silicon dioxide ($SiO_2$; refractive index: 1.5) or air (refractive index: 1) (see, for example, Japanese Laid-Open Patent Publication No. 2002-350657).

Among others, there has been proposed an optical waveguide (Chutinan et. al., Physical Review B, vol. 62, No. 7, p 4488 2000) in which periodic cylindrical air holes are provided in a semiconductor substrate to create a photonic band, thus making it possible to deflect an optical path by a sharp angle of 90°.

FIG. 1 shows an example of an optical waveguide device utilizing a photonic crystal structure (Chutinan et. al., Physical Review B, vol. 62, No. 7, p 4488 2000). This optical waveguide device is produced by forming a periodic array of many air holes 102 on a substrate 101, which is formed of InP or GaAs. A linear defect portion 103, in which no air holes 102 are present, has no photonic band therein and is able to transmit light in a broad range of wavelengths.

Thus, by providing photonic crystal regions on both sides of an optical waveguide, it becomes possible, with the action of the band structures in the photonic crystal regions, to confine within the optical waveguide any light of a wavelength of which transmission is to be prohibited.

With such an optical waveguide device, it is possible to realize a optical waveguide which is bent at a sharp angle that cannot be attained by a conventional refractive-index-type optical waveguide device, and there are aspirations towards application to optical circuit devices which are on the wavelength order. As for the optical waveguide device shown in FIG. 1, many applications have been proposed, such as an optical integrated circuit in which optical filters, semiconductor lasers, and the like are integrated.

Moreover, U.S. Pat. No. 6,853,791 discloses an optical waveguide device utilizing a slab-like photonic crystal which is formed by forming air holes at triangular lattice points. In this optical waveguide device, the size and shape of air holes at specific lattice point positions in the triangular lattice are made different from the size and shape of the air holes in other lattice point positions, thus forming a line defect region which functions as an optical waveguide.

However, the optical waveguide device shown in FIG. 1 has a problem in that the transmittance becomes lower than expected. This problem will by described by referring to FIG. 2.

FIG. 2 shows a plan view of an optical waveguide which is interposed between photonic crystal regions, and an enlarged view of a portion thereof.

According to a study by the inventors, the cause for the lowered transmittance is the effective refractive index of the optical waveguide being changed periodically along the waveguiding direction by air holes 202 and 203 which are arranged in a periodic array for forming a photonic crystal structure. Specifically, in a substrate 201, the effective refractive index of each first portion 204 which is interposed between two air holes 202 and 203 becomes lower than the effective refractive index of any second portion 205 which is interposed between two adjoining first portions 204. Therefore, inside the optical waveguide, the effective refractive index is periodically changed along the waveguiding direction, such that the optical waveguide characteristics will exhibit resonator-like properties. As a result of this, some of the light propagating through the optical waveguide resonates, and thus the characteristics of the optical waveguide are deteriorated due to reflection or undesirable band characteristics.

In the optical waveguide device disclosed in U.S. Pat. No. 6,853,791, air holes of e.g. an elliptical shape are formed in positions corresponding to the second portions 205 in FIG. 2. By adopting such a structure, the effective refractive index of the second portions 205 is greatly lowered than the refractive index of the substrate material, which means that the effective refractive index of the first portions 204 will be higher than the effective refractive index of the second portions 205. Therefore, the problem of resonator-like properties appearing in the optical waveguide characteristics is not solved by the waveguide device of U.S. Pat. No. 6,853,791, either.

SUMMARY OF THE INVENTION

In order to overcome the problems described above, a main purpose of the present invention is to provide an optical waveguide device which compensates for periodic changes in the effective refractive index which occur in an optical waveguide due to influences of photonic crystal regions, thus allowing for improved transmission characteristics.

An optical waveguide device comprises: a plurality of photonic crystal regions, each having holes arranged in a periodic array; and an optical waveguide formed between the photonic crystal regions, wherein, among the plurality of holes contained in the photonic crystal regions, a plurality of holes adjoining the optical waveguide on both sides of the optical waveguide are symmetrically arrayed with respect to a center axis which extends along a waveguiding direction of the optical waveguide; within the optical waveguide, a plurality of high refractive index portions are periodically arranged along the waveguiding direction, the plurality of high refractive index portions being composed of a material whose effective refractive index is higher than an effective refractive index of any other portion, where each of the plurality of high refractive index portions is generally interposed between a pair of holes which are in symmetric positions with respect to the center axis; and the center of gravity of every high refractive index portion is shifted along the waveguiding direction from a midpoint of a line interconnecting centers of the pair of holes sandwiching the high refractive index portion, and is located between a position which is 0.45 r away from the midpoint in the waveguiding direction and a position which is 0.25 r away from the midpoint in a direction opposite to the waveguiding direction, where r is a radius of each hole.

In a preferred embodiment, In a preferred embodiment, an array period of the plurality of high refractive index portions is equal to an array period of the holes in the plurality of photonic crystal regions.

In a preferred embodiment, the plurality of photonic crystal regions and the optical waveguide are formed on a substrate.

In a preferred embodiment, at least a surface region of the substrate is formed of a first material; and the plurality of high refractive index portions are formed of a second material having a different refractive index from a refractive index of the first material.

In a preferred embodiment, the second material composing the plurality of high refractive index portions fills holes formed in the substrate.

In a preferred embodiment, the second material contains a simple substance, alloy, or compound of at least one type of metal selected from the group consisting of Ga, Si, Al, Ga, Nb, Ta, Ti, Zn, Au, Pt, Ni, and Ge.

In a preferred embodiment, the metal compound is a compound of: at least one type of element selected from the group consisting of phosphorus, nitrogen, oxygen, and arsenic; and the metal.

In a preferred embodiment, the substrate is formed of lithium niobate ($LiNbO_3$); and the plurality of high refractive index portions are formed of aluminum nitride (AlN).

In a preferred embodiment, the substrate is formed of lithium niobate ($LiNbO_3$); and the plurality of high refractive index portions are formed of niobium oxide ($Nb_2O_5$).

In a preferred embodiment, the plurality of high refractive index portions are formed of modified portions of the substrate.

In a preferred embodiment, the modified portions of the substrate are portions of the substrate where a metal element is diffused.

In a preferred embodiment, the substrate has: a plate member, including the plurality of photonic crystal regions and the optical waveguide; and a base member supporting the plate member; and the holes are throughholes penetrating the plate member.

In a preferred embodiment, an air gap is provided between the plate member and the base member.

In accordance with the optical waveguide device of the present invention, it is possible to reduce periodic changes in the effective refractive index which would have occurred in an optical waveguide of a conventional optical waveguide device, and to control the flow of optical energy. As a result, the resonance occurring due to periodic changes in the effective refractive index in the optical waveguide can be reduced, and the transmission characteristics can be improved, whereby the light reflection loss is reduced. Therefore, by using the optical waveguide device of the present invention, a very small optical circuit can be realized, and it is possible to downsize and enhance the performance of an optical device such as an optical modulator.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 8A is a plan view of an optical waveguide device according to Embodiment 2 of the present invention. FIG. 8B is a cross-sectional view taken along line A–A'. FIG. 8C is a cross-sectional view taken along line B–B'.

DETAILED DESCRIPTION OF PREFERRED EMBODIMENTS

Figure 1:
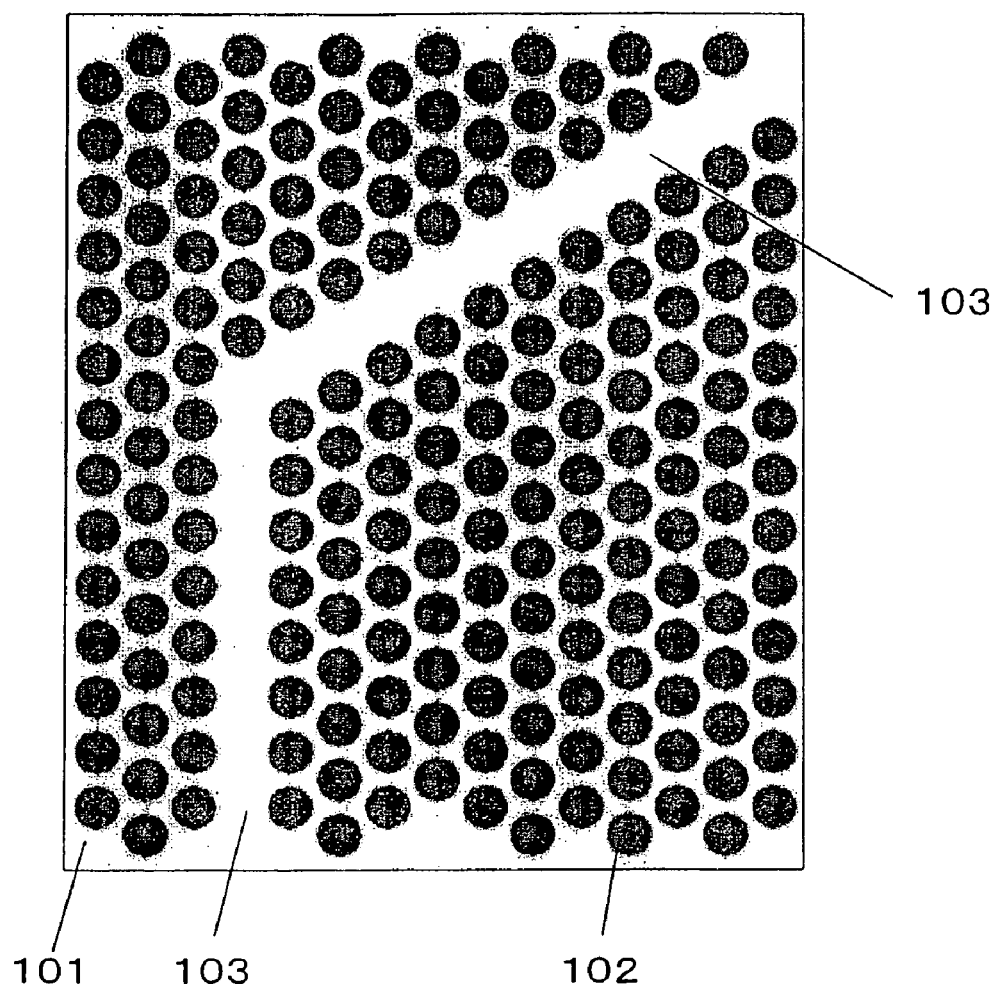
FIG. 1 is a plan view showing a conventional example of an optical waveguide device having a photonic crystal structure.

Hereinafter, embodiments of the optical waveguide device according to present invention will be described with reference to the accompanying drawings.

(Embodiment 1)

First, a first embodiment of the optical waveguide device according to the present invention will be described with reference to FIGS. 3A to 3C.

A substrate 301 of an optical waveguide device according to the present embodiment has formed thereon: a plurality of photonic crystal regions 305, each having a periodic array of holes 304; and an optical waveguide 302 disposed between the plurality of photonic crystal regions 305.

The holes 304 in each photonic crystal region 305 shown compose a two-dimensional array forming a triangular lattice, with an array period (lattice constant) a which is prescribed to be on the order of a light wavelength. The length of the optical waveguide 302 in the illustrated optical waveguide device is about 10×λ, where λ is a wavelength of the light to be waveguided. However, the values of the waveguide length and other parameters of the optical waveguide device according to the present invention are not limited to such.

The optical waveguide 302 is positioned in a portion of the substrate 301 where the holes 304 are not formed. A plurality of refractive index compensating regions 303 are periodically arranged in the optical waveguide 302, along an optical waveguiding direction. The array period of the refractive index compensating regions 303 is the same as the array period of the holes 304. The refractive index compensating regions 303 are formed of a second material which has a different refractive index from the refractive index of the material of the substrate 301 ("first material"). In the present embodiment, the refractive index of the second material is prescribed to be higher than the refractive index of the first material, and therefore each refractive index compensating region 303 in the present embodiment functions as a "high refractive index portion". Therefore, when taken by itself, the refractive index of the optical waveguide 302 would appear to be periodically modulated along the optical waveguiding direction. However, the refractive index modulation by the refractive index compensating regions 303 functions so as to cancel the periodic refractive index modulation which is imparted to the optical waveguide 302 by the holes 304 in the photonic crystal regions 305.

In the present embodiment, for reasons which will be specifically described later, a high transmittance is attained by adjusting the positions of the refractive index compensating regions 303 along a direction parallel to the optical waveguiding direction. Specifically, the position of the center of gravity of each refractive index compensating region 303 is shifted along the waveguiding direction from a midpoint of a line interconnecting the centers of opposing holes 302 across the optical waveguide 302, so as to fall between a position which is 0.45 r away from the midpoint in the waveguiding direction and a position which is 0.25 r away from the midpoint in a direction opposite to the waveguiding direction. Assuming that light enters at the left end of the optical waveguide 302 and goes out at the right end in FIG. 3A, the "waveguiding direction" is defined as the "right direction" in FIG. 3A, and the "direction opposite to the waveguiding direction" is the "left direction" in FIG. 3A.

Figure 2:
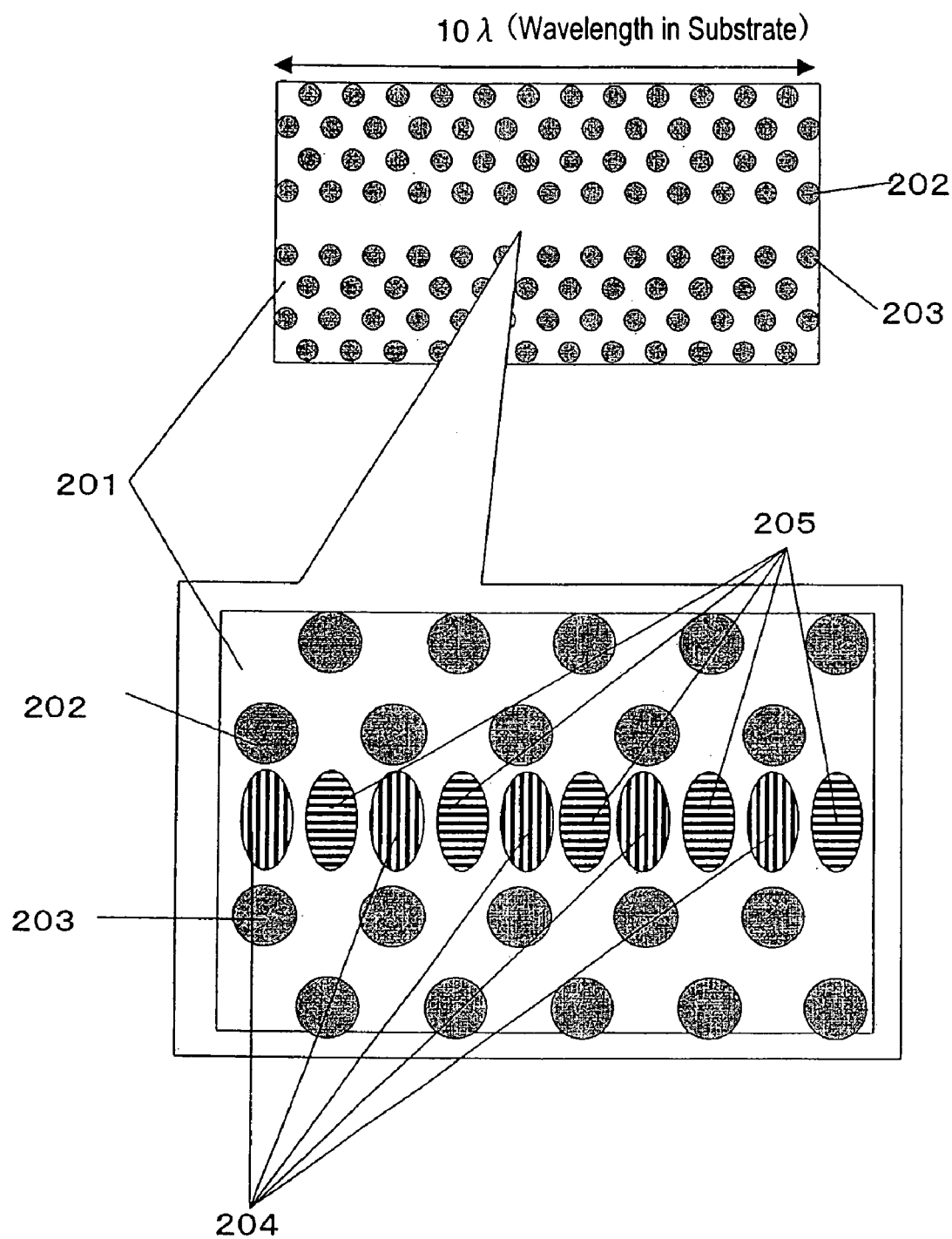
FIG. 2 is a diagram schematically showing a refractive index distribution in an optical waveguide of a conventional optical waveguide device.

Owing to the above structure, the effective refractive index of the optical waveguide 302 interposed between the photonic crystal regions is made substantially uniform along the optical waveguiding direction. As a result, the problem of the conventional optical waveguide device which has been described with reference to FIG. 2 is solved, and the transmission characteristics of the optical waveguide are improved.

The substrate 301 in the present embodiment is preferably formed of a semiconductor or dielectric. As a semiconductor, for example, Si, GaAs, InP, or a mixed crystal material thereof can be used. As a dielectric, for example, a dielectric material such as sapphire, lithium niobate ($LiNbO_3$), lithium tantalate ($LiTaO_3$), or potassium titanate ($KTiOPO_4$) can be used.

In the case where the optical waveguide device of the present embodiment is to be applied to an optical modulator or the like, or used in a high frequency band (e.g., extremely high frequency (EHF)), it is preferable to prescribe the thickness of the substrate 301 to be in a range from 50 µm to 300 µm, in order to suppress unwanted resonation of the electromagnetic field within the substrate 301. Instead of reducing the thickness of the entire substrate 301, a portion of the thickness of the substrate (optical waveguide portion) may be reduced to 10 µm to 200 µm, whereby unwanted resonation can also be suppressed.

As a material (second material) composing the refractive index compensating regions 303, a metal, dielectric, semiconductor, or a mixture thereof can be used. Especially by using a mixture glass of dielectric materials, refractive index adjustment is enabled in a wide range. Examples of metals that can be adopted include Ti, Au, Pd, Pt, Ag and Zn; examples of dielectrics include $SiO_2$, $Al2O_3$, SiN, $Nb_2O_5$ and $Ta_2O_5$; and examples of semiconductors include Si, GaAs, InP, GaP, GaN, InN and AlN, or mixed crystals thereof.

The optical waveguide 302, which is called a "line defect optical waveguide within a photonic crystal", is formed between a plurality of photonic crystal regions 305 which are formed on the substrate 301. The photonic crystal structure is formed of periodic arrays of a multitude of holes 304 provided in the substrate 301. Based on the array period and array pattern of the holes 304, the band structure in the photonic crystal structure can be adjusted. The holes 304 in the present embodiment are air holes, whose interior is filled with air. The interior of the holes 304 may be filled with a material having a refractive index which is sufficiently lower than the refractive index of the substrate material.

Figure 3A:
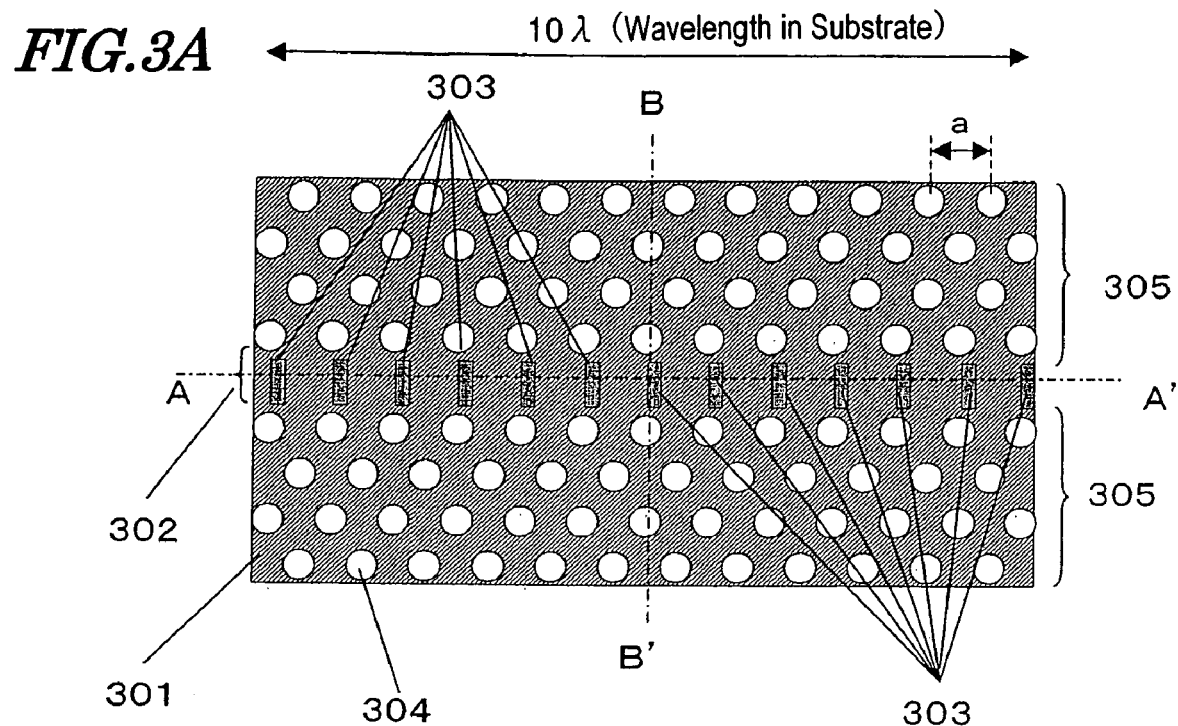
FIG. 3A is a plan view of an optical waveguide device according to Embodiment 1 of the present invention.
Figure 3B:
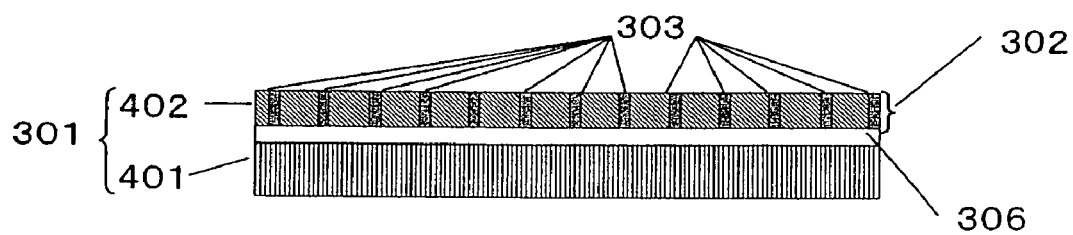
FIG. 3B is a cross-sectional view taken along line A–A'.
Figure 3C:
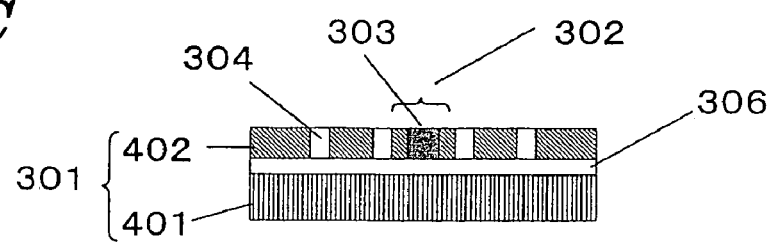
FIG. 3C is a cross-sectional view taken along line B–B'.

As shown in FIGS. 3B and 3C, the optical waveguide 302 and the photonic crystal regions 305 in the present embodiment are formed in a relatively thin plate member (slab) 402, the plate member 402 being supported by a relatively thick base member 401. It is desirable to provide an air gap 306 underneath the plate member 402. The air gap 306 is transparent with respect to light of an arbitrary wavelength. A structure having such an air gap 306 is called an air bridge structure.

In accordance with the optical waveguide device of the present embodiment, by appropriately adjusting the refractive index of the refractive index compensating regions 303 which are formed within the optical waveguide 302, it is possible to compensate for the periodic modulation in the effective refractive index that is caused in the optical waveguide 302 by the holes 304.

Next, a method for producing the optical waveguide device of the present embodiment will be described with reference to FIGS. 4A to 4H.

Figure 4A:
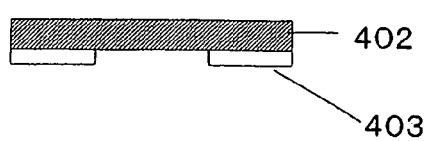
FIGS. 4A to 4H are step-by-step cross-sectional views showing a production method for the optical waveguide device of Embodiment 1.

First, an LiNbO₃ wafer which has been cut along a plane (z plane) that is perpendicular to the z axis is prepared. After cleaning, as shown in FIG. 4A, a mask pattern 403 is formed on the rear face of the wafer (plate member 402). The mask pattern 403 has an opening for exposing a region in which the air gap 306 is to be formed, and is typically formed of a resist layer which has been patterned by photolithograpy technique. In the end, the plate-like portion 402 is to be supported by the base member 401 via the air gap 306.

Figure 4B:

Next, as shown in FIG. 4B, the region of the rear face of the plate member 402 that is not covered by the mask pattern 403 is etched, thus forming a recess 404. This etching can be performed through dry etching using a fluorine-type gas and argon gas. After the etching, the mask pattern 403 is removed.

Figure 4C:
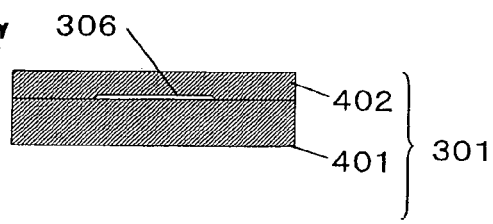

Thereafter, as shown in FIG. 4C, the plate member 402 is bonded to the base member 401 in such a manner that the face of the plate member 402 in which the recess 404 is formed opposes the upper face of the base member 401. This bonding can be performed through heating while pressing the plate member 402 against the base member 401. The base member 401 and the plate member 402 together compose the substrate 301.

Figure 4D:
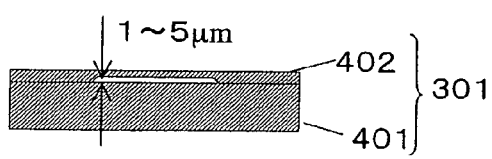

By performing an optical polishing or dry etching for the surface of the plate member 402, the plate member 402 is made thinner until the thickness of the plate member 402 in the region where the recess 404 is formed is adjusted to about 3 μm (FIG. 4D). The thickness of the above region of the plate member 402 defines the thickness of the optical waveguide 302. This thickness is preferably prescribed to be within a range of about 1 μm to about 5 μm.

Figure 4E:
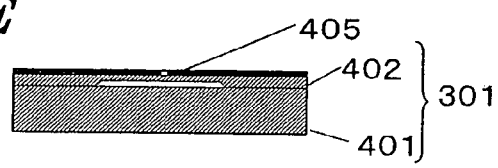

After cleaning the substrate 301, a resist for electron beam lithography is applied onto the surface of the plate member 402. By irradiating this resist with an electron beam, a resist pattern 405 as shown in FIG. 4E is formed. In the resist pattern 405, a plurality of openings which define the shapes and positions of the refractive index compensating regions 302 shown in FIGS. 3A to 3C are formed.

Figure 4F:
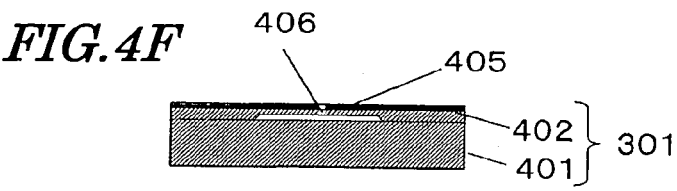

By anisotropically etching the portions of the plate member 402 that are not covered by the resist pattern 405, recesses 406 are formed in the plate member 402 as shown in FIG. 4F. This etching can be performed by using a chlorine-type or SF₆ gas, for example. The recesses 406 are periodically arranged in the region where the optical waveguide is to be formed. The recesses 406 are formed in the portions of the plate member 402 where the refractive index compensating regions 303 shown in FIG. 3A are to be formed. The shapes of the recesses 406 can be arbitrarily prescribed by adjusting the shapes of the openings in the resist pattern 405. Note that, when the recesses 406 have just been formed, the holes 304 shown in FIG. 3A are yet to be formed, and both sides of the optical waveguide 302 are still covered by the resist pattern 405.

Next, aluminum nitride (AlN) is deposited from over the resist pattern 405 to fill the interiors of the recesses 406 with aluminum nitride, thus forming the refractive index compensating regions 303. At this time, aluminum nitride is also deposited upon the resist pattern 405. The aluminum nitride deposition can be performed by using an RF magnetron sputtering apparatus, for example. Instead of aluminum nitride, any other material may be filled into the recesses 406. The refractive index of the material to be filled into the recesses 406 has a different value from that of the refractive index of the plate member 401. The recesses 406 in the present embodiment have planar shapes corresponding to the shapes of the rectangular refractive index compensating regions 303 shown in the plan view of FIG. 3A. Although FIG. 3A illustrates the planar shapes of the refractive index compensating regions 303 to be rectangular, the planar shapes of the recesses 406 which are formed through an actual etching may be rounded.

Although FIGS. 3B and 3C illustrate the depth of the recesses 406 (i.e., refractive index compensating regions 303) to be equal to the thickness of the plate member 402, the recesses 406 do not penetrate the plate member 402 in actuality. Rather, the bottom faces of the recesses 406 hold up the aluminum nitride. It is also possible to control their equivalent refractive indices by adjusting the depths of the recesses 406. In the case where it is difficult to prescribe the refractive index of the material filling the interiors of the recesses 406 so as to be in a desired range, it would be especially effective to create an appropriate effective refractive index difference by varying the depths of the recesses 406. In order to equalize the depths of the recesses 406, an etching stop layer may be provided on the rear face side of the plate member 401.

Figure 4G:
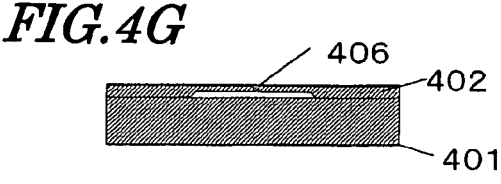

Next, the resist pattern 405 is removed as shown in FIG. 4G, whereby the aluminum nitride which has been deposited on the resist pattern 405 is removed from the plate member 402 (lift-off), thus exposing the surface of the plate member 402.

Figure 4H:
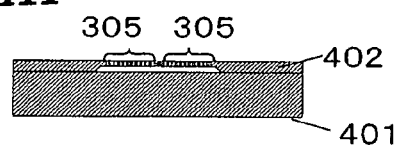

Thereafter, through a method similar to the method for forming the recesses 406, a multitude of holes (holes 304 in FIGS. 3A to 3C) are formed on the outer sides of the region of the plate member 402 in which the optical waveguide is to be formed, thus forming the photonic crystal regions 305 shown in FIG. 4H. Thus, the optical waveguide device of the present embodiment having an air bridge structure is completed.

The above-described production method is especially effective in the case where a large difference is to be prescribed between the refractive index of the refractive index compensating regions 303 and the refractive index of the plate member 402. The refractive index of the refractive index compensating regions 303 can be adjusted within a wide range by appropriately selecting the material with which to fill the interiors of the recesses 406.

In the optical waveguide device shown in FIG. 3A, among the plurality of holes 304 contained in the photonic crystal regions 305, the plurality of holes 304 adjoining the optical waveguide 302 on both sides of the optical waveguide 302 are arrayed symmetrically with respect to a center axis which extends along the optical waveguiding direction of the optical waveguide 302. In other words, the holes 304 which are periodically arrayed close to the optical waveguide 302 on one side of the optical waveguide 302 oppose the holes 304 which are periodically arrayed close to the optical waveguide 302 on the other side of the optical waveguide 302. Every two holes 304 opposing each other across the center axis sandwich the optical waveguide 302. In the optical waveguide 302, the effective refractive index of any portion sandwiched between two opposing holes 304 is made higher than the effective refractive index of any portion that is not sandwiched between two opposing holes 304, due to the presence of a refractive index compensating region 303.

In the conventional optical waveguide device shown in FIG. 2, since the width of the optical waveguide periodically changes along the optical waveguiding direction due to the holes 202 and 203 provided in order to form an optical waveguide, the magnitude of the effective refractive index of the optical waveguide changes periodically. Therefore, the optical waveguide itself acquires filter-like resonation characteristics, hence leading to problems such as poor transmission characteristics, emergence of band characteristics, and so on. On the other hand, in the optical waveguide device of the present embodiment, changes in the effective refractive index of the optical waveguide are alleviated by the action of the refractive index compensating regions, whereby the transmission characteristics are improved.

EXAMPLE 1

With respect to the optical waveguide device shown in FIGS. 3A to 3C, the relationship between the positioning and the refractive index of the refractive index compensating region 303 and light transmittance has been studied. Hereinafter, the results of the study will be described.

Each refractive index compensating region 303 in the present example has a rectangular shape, and has a width (i.e., dimension along the direction perpendicular to the optical waveguiding direction of the optical waveguide) which is 0.8 times (480 nm) as large as the period of the photonic crystal structure (a=600 nm), and has a length (i.e., dimension along the optical waveguiding direction of the optical waveguide) which is 0.5 times (240 nm) as large as the diameter (2 r=480 nm) of the holes 304.

Figure 5A:
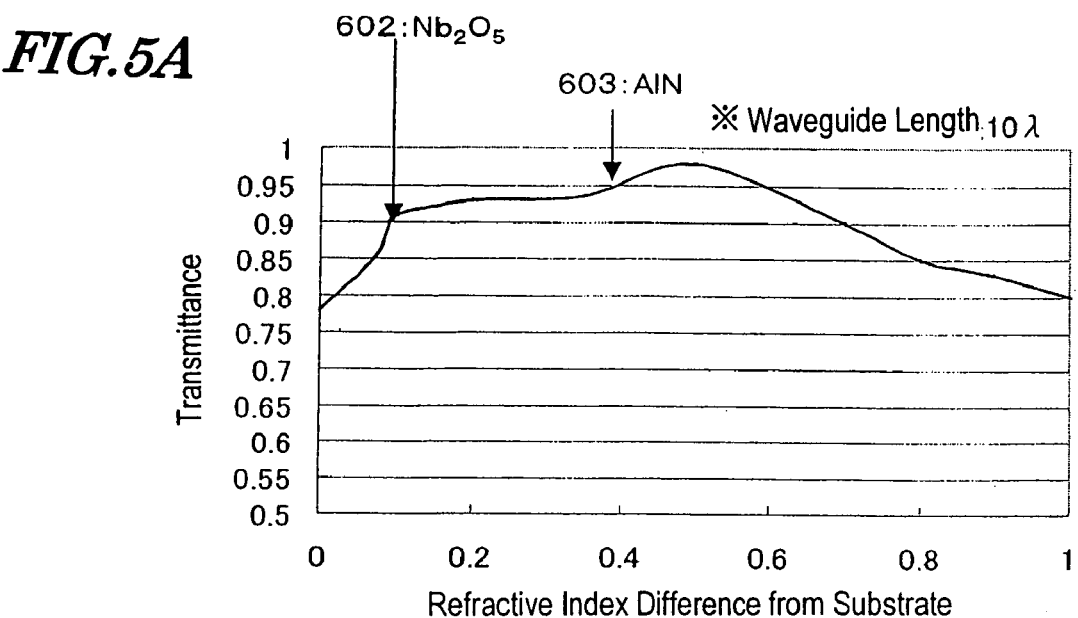
FIG. 5A is a graph showing a relationship between: a refractive index difference between a substrate and refractive index compensating regions (high refractive index portions) in Example 1; and optical waveguide transmittance.

FIG. 5A is a graph showing the relationship between: a difference between the refractive index of the refractive index compensating regions 303 and the refractive index of the lithium niobate substrate in the present example; and the transmittance of the optical waveguide. In FIG. 5A, "refractive index difference from substrate" means a refractive index difference between the refractive index compensating regions 303 and the lithium niobate substrate; and "transmittance" is a ratio of the intensity of the light emitted from the optical waveguide (length: 7 μm), where the intensity of the light entering the optical waveguide (free space wavelength: 1.5 μm; wavelength in the substrate: about 0.7 μm) is assumed to be 1.

Figure 5B:
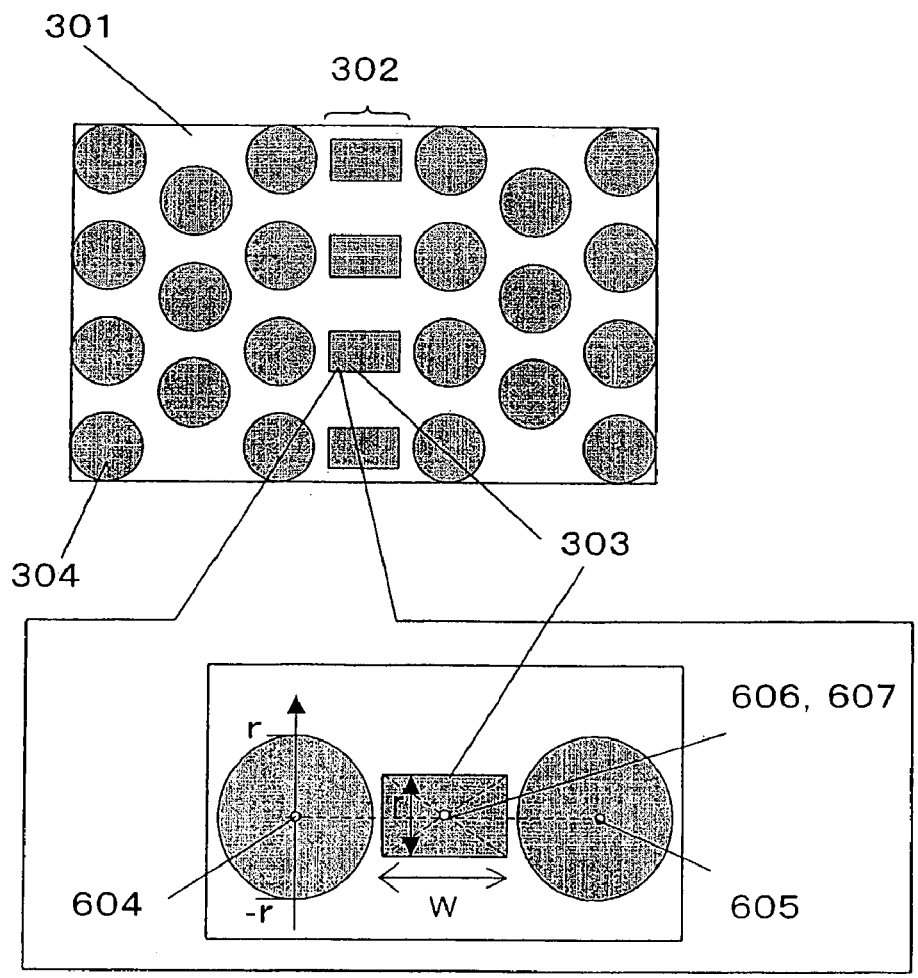
FIG. 5B is a plan view schematically showing the positioning of refractive index compensating regions.

FIG. 5B is a plan view showing a main portion of the optical waveguide device in the present example. FIG. 5B shows an example where each refractive index compensating region 303 is positioned so that a midpoint 606 of a line segment interconnecting centers 604 and 605 of two opposing air holes sandwiching the optical waveguide coincides with the center of gravity 607 of the rectangle. In the figure, the width of the refractive index compensating region 303 is denoted by the letter "W".

As can be seen from FIG. 5A, the transmittance of the optical waveguide in a conventional optical waveguide device having no refractive index compensating regions 303 provided in the optical waveguide (refractive index difference=0) is 0.78.

In the range where the refractive index difference from the substrate is between 0 and 0.085, the transmittance rapidly increases with increase in the refractive index difference, the transmittance reaching 0.90 at a refractive index difference of 0.085. In the range where the refractive index difference is between 0.085 and 0.5, the transmittance gently increases with increase in the refractive index difference, reaching a maximum transmittance (0.98) at a refractive index difference of about 0.5.

As the refractive index difference further increases beyond 0.5, the transmittance decreases from its maximum value, but still a higher transmittance than the transmittance (0.78) of the conventional optical waveguide device is obtained unless the refractive index difference exceeds 1. Although not shown in the graph of FIG. 5A, it is presumable that the transmittance will continue to decrease as the refractive index difference further increases beyond 1. This is because the periodic effective refractive index difference in the conventional optical waveguide (which lacks the refractive index compensating regions 303) cannot be reduced, and, to the contrary, even greater periodic effective refractive index differences occur.

A point indicated by an arrow 602 in FIG. 5A corresponds to a refractive index difference between lithium niobate (refractive index: about 2.2) and $Nb_2O_5$ (refractive index: about 2.3). A point indicated by an arrow 603 shows a refractive index difference between aluminum nitride (AlN) and lithium niobate ($LiNbO_3$, also abbreviated as "LN").

From the standpoint of increasing the transmittance to 85% or more, it is preferable to prescribe the refractive index difference between the refractive index compensating regions 303 and the other regions in the optical waveguide to be within a range from 0.085 to 0.6. In order to increase the transmittance to 95% or more, it is preferable to prescribe the aforementioned refractive index difference to be within a range from 0.38 to 0.6. Note that the reason why the upper limit of the preferable range of the refractive index difference is 0.6 is that it is difficult to actually use a material which will raise this refractive index difference to above 0.6.

Figure 13:
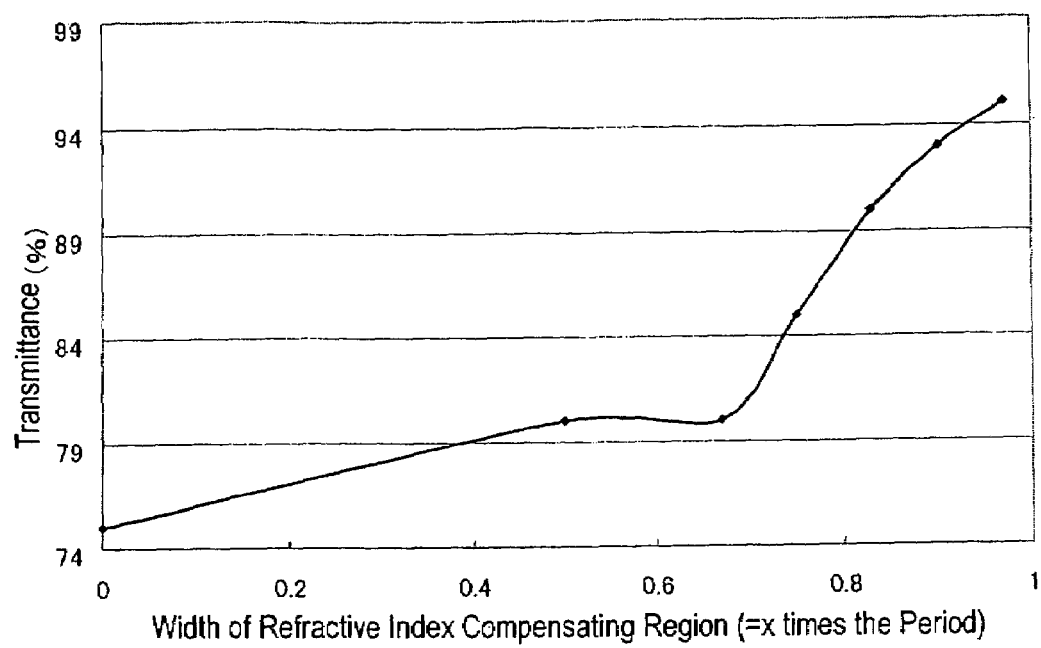
FIG. 13 is a graph showing a relationship between the width of the refractive index compensating regions and optical waveguide transmittance in Example 1 (waveguide length: 10λ).

FIG. 13 shows a relationship between the width (i.e., dimension along the direction perpendicular to the optical waveguiding direction of the optical waveguide) of the refractive index compensating regions 303 and the transmittance of the optical waveguide. When the width of the refractive index compensating region 303 has a magnitude which is 0.75 to 1 times as large as the array period a of the holes 304 in the photonic crystal region (see FIG. 3A; a=600 nm in the present example), the transmittance is 85% or more. Therefore, a preferable ratio range of the width of the refractive index compensating regions 303 to the array period a is no less than 0.75 and no more than 1. A more preferable ratio range of the width of the refractive index compensating region 303 to the array period a is 0.83 to 0.97. Within this range, the transmittance stays at 90% or more, so that there exists hardly any interference from the holes composing the photonic crystal structure.

Note that, in the case where the refractive index difference is to be adjusted by varying the depths of the refractive index compensating regions 303, it is preferable to adjust the depths of the refractive index compensating regions 303 within a depth at which the electromagnetic field of the light waves propagating through the optical waveguide exists. In the present embodiment, the electromagnetic field of the light waves propagating through the optical waveguide exists at a depth of about 3 μm. In order to create any significant effective refractive index difference, it is desirable to modulate the depths of the refractive index compensating regions 303 within a range of 30% to 95% of the depth at which the electromagnetic field of the light waves propagating through the optical waveguide exists.

Figure 6A:
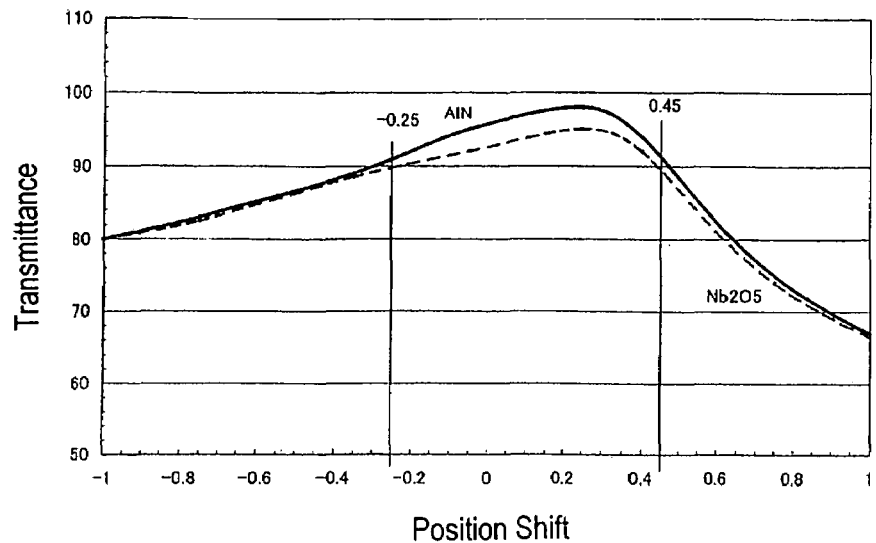
FIG. 6A is a graph showing a relationship between position shifts in the refractive index compensating regions (high refractive index portions) and optical waveguide transmittance in Example 1.
Figure 6B:
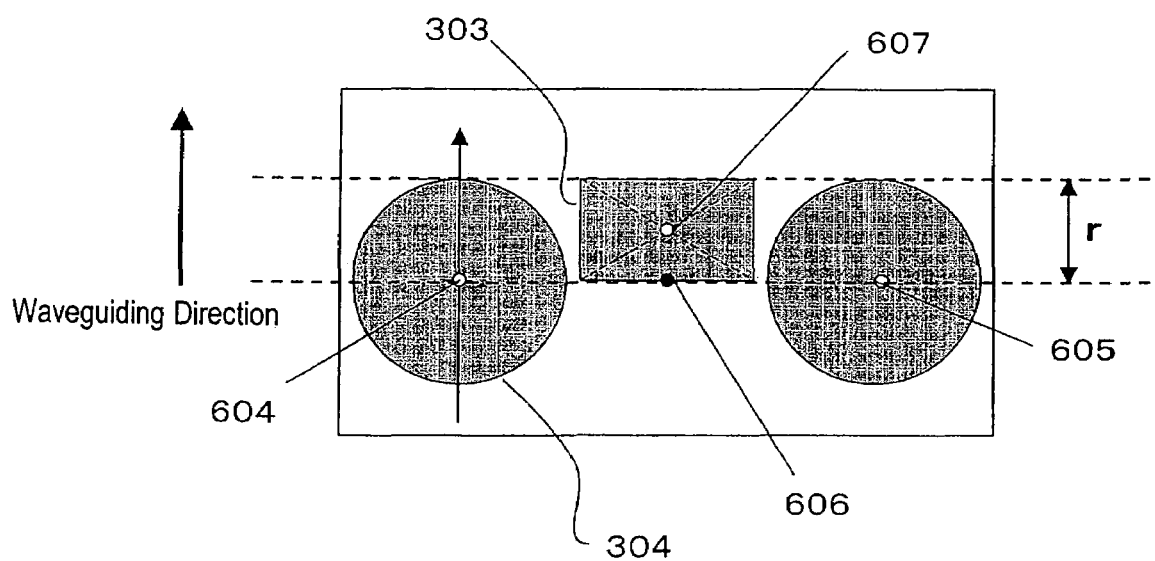
FIG. 6B is a plan view schematically showing the positioning of a refractive index compensating region.

FIG. 6A is a graph showing the relationship between position shift amounts of the refractive index compensating regions 303 and the transmission characteristics. FIG. 6B is a plan view showing a position shift of a refractive index compensating region 303. The horizontal axis of the graph of FIG. 6A represents the position shift amount of each refractive index compensating region 303. The position shift amount indicates how much and in which direction the center of gravity 607 of each refractive index compensating region 303 is shifted relative to the midpoint position 606 of a line segment interconnecting the centers 604 and 605 of two opposing air holes sandwiching the optical waveguide (see the enlarged view in FIG. 5B). In the case where the position is shifted in a direction opposite to the optical waveguiding direction, the "–" symbol is added before the position shift amount.

In FIG. 6A, calculation results of the case where LiNbO$_3$ is used as the substrate material and AlN is used as the material of the refractive index compensating regions 303 are shown with a solid line, whereas the calculation results of the case where LiNbO$_3$ is used as the substrate material and Nb$_2$O$_5$ is used as the material of the refractive index compensating regions 303 are shown with a broken line.

As will be clear from the graph of FIG. 6A, the transmittance exhibits the highest value when the position shift amount is "0.25", i.e., when the position of the center of gravity of each refractive index compensating region 303 is shifted by 0.25 r in the optical waveguiding direction. Hereinafter, the reason will be described with reference to FIGS. 7A and 7B.

Figure 7A:
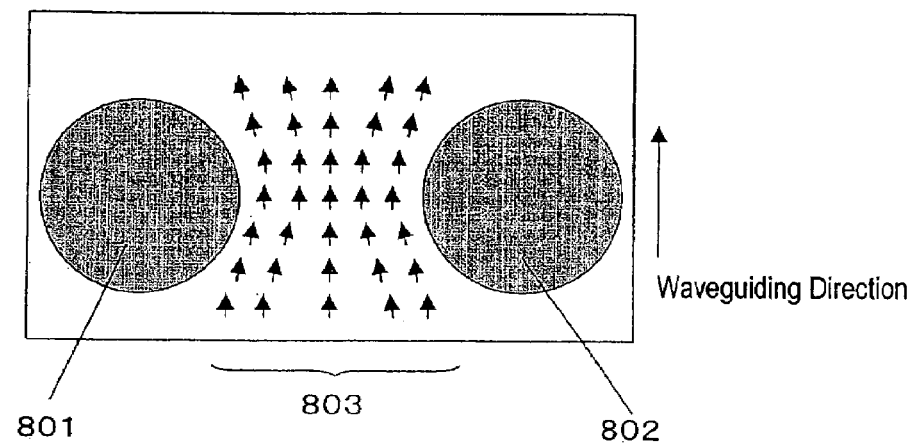
FIG. 7A is a diagram showing pointing vectors in a conventional optical waveguide.
Figure 7B:
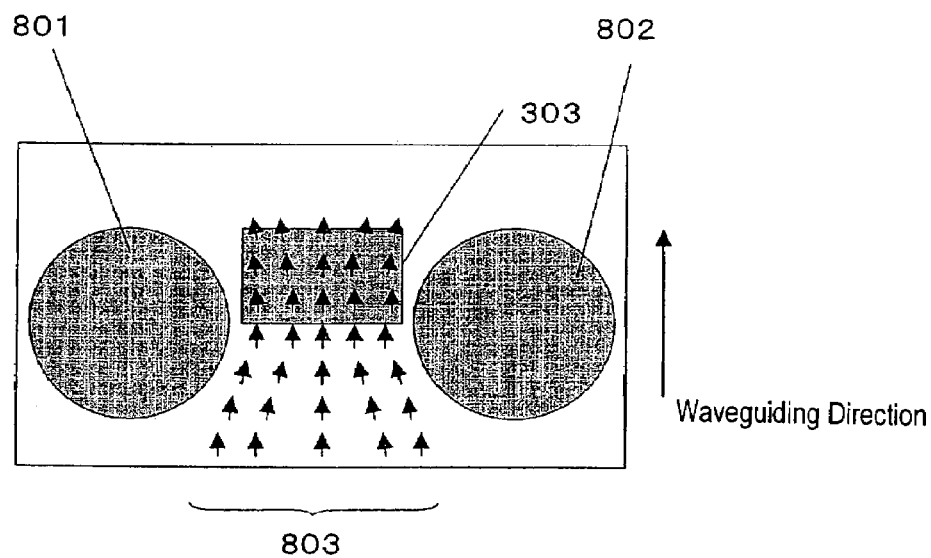
FIG. 7B is a diagram showing pointing vectors in the optical waveguide of Embodiment 1.

FIG. 7A is a plan view showing a main portion of a conventional optical waveguide device which lacks refractive index compensating regions 303. FIG. 7B is a plan view showing a main portion according to the present embodiment.

The arrows in FIGS. 7A and 7B represent pointing vectors of waveguided light. In the conventional example shown in FIG. 7A, optical energy flows along the holes 801 and 802. In other words, the flow of optical energy is disturbed by the refractive index compensating regions 801 and 802, thus heading toward directions other than the optical waveguiding direction, thus causing optical loss.

On the other hand, as shown in FIG. 7B, the refractive index compensating regions 303 in the structure of the present embodiment reduce such deflection of the pointing vectors 803 along the holes 801 and 802. In other words, the direction in which optical energy propagates is aligned by the refractive index compensating region 303 to the optical waveguiding direction, whereby a further improvement in transmission characteristics is obtained.

In order to attain a transmittance of 90% or more, it is desirable to position each refractive index compensating region 303 so that the distance from the midpoint 606 of a line segment interconnecting the centers 604 and 605 of the two adjoining air holes to the center of gravity 607 of the rectangle is in a range from –0.25 r to 0.45 r, and more desirably in a range from 0 to 0.35 r.

Note that, in the conventional waveguide device described in U.S. Pat. No. 6,853,791, the position of the center of gravity of each elliptical hole is shifted about 0.5 r from the midpoint of a line segment interconnecting the centers of the two adjoining air holes, and therefore the aforementioned effect cannot be obtained.

As described above, in accordance with the optical waveguide device of the present embodiment, improved transmission characteristics are obtained based on: (1) an effect of compensating for periodic effective refractive index differences, and (2) an effect of controlling the direction in which optical energy propagates.

In the present embodiment, LiNbO$_3$ is used as the substrate material, and the refractive index compensating regions 303 are composed of high refractive index portions of AlN or Nb$_2$O$_5$. However, the material of the high refractive index portions is not limited to AlN and Nb$_2$O$_5$. Instead, high refractive index portions of any other material may be used so long as the material has an appropriate refractive index for canceling the decreases in the effective refractive index of the optical waveguide that are caused by holes adjoining the optical waveguide.

A second material which has a higher refractive index than the refractive index of the substrate may contain, for example, a simple substance, alloy, or compound of at least one type of metal selected from the group consisting of Ga, Si, Al, Ga, Nb, Ta, Ti, Zn, Au, Pt, Ni, and Ge. In the case where a metal compound is used as a second material, it is possible to use a compound of: at least one type of element selected from the group consisting of phosphorus, nitrogen, oxygen, and arsenic; and any of the aforementioned metals.

(Embodiment 2)

Next, with reference to FIGS. 8A to 8C, a second embodiment of the optical waveguide device according to the present invention will be described.

In the optical waveguide device of the present embodiment, as shown in FIG. 8A, two photonic crystal regions 905 are formed, each having a periodic array of holes 904 which have a different refractive index from the refractive index of a substrate 901. An optical waveguide 902 is formed at a position interposed between the two photonic crystals regions 905. In the optical waveguide 902, refractive index compensating regions 903 having a different refractive index from the refractive index of the substrate 901 are periodically arranged, along an optical waveguiding direction.

The substrate 901 is formed of the same material as the material of the substrate 301 in Embodiment 1. On the other hand, the refractive index compensating regions 903 are formed by thermally diffusing a metal such Ti or Zn into predetermined regions of the substrate 903, thus increasing the refractive index of the predetermined regions relative to that of the other portions of the substrate 901.

Next, with reference to FIGS. 9A to 9H, a production method according to the present embodiment will be described.

Figure 9A:
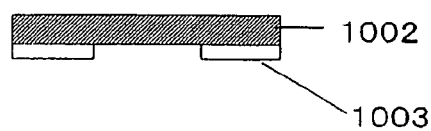
FIGS. 9A to 9H are step-by-step cross-sectional views showing a production method for the optical waveguide device of Embodiment 2.

First, an LiNbO$_3$ wafer which has been cut along a plane (z plane) that is perpendicular to the z axis is prepared. After cleaning, as shown in FIG. 9A, a mask pattern 103 is formed on the rear face of the wafer (plate member 1002). This plate member 1002 is a portion of the substrate 901 shown in FIGS. 8B and 8C where the optical waveguide 902 and the photonic crystal regions 905 are to be formed. In the end, the plate-like portion 1002 is to be supported by a base member 1001 via an air gap 906.

The mask pattern 1003 has an opening for exposing a region in which the air gap 906 is to be formed, and is typically formed of a resist layer which has been patterned by photolithograpy technique.

Figure 9G:
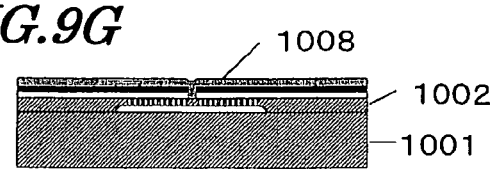
Figure 9B:

Next, as shown in FIG. 9B, the region of the rear face of the plate member 1002 that is not covered by the mask pattern 1003 is etched, thus forming a recess 1004. This etching can be performed through dry etching using a fluorine-type gas and an argon gas. After the etching, the mask pattern 1003 is removed.

Figure 9H:
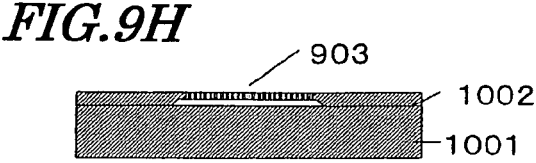
Figure 9C:
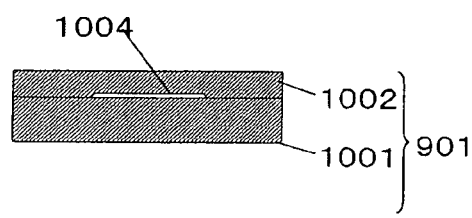

Thereafter, as shown in FIG. 9C, the plate member 1002 is bonded to the base member 1001 in such a manner that the face of the plate member 1002 in which the recess 1004 is formed opposes the upper face of the base member 1001. This bonding can be performed through heating while pressing the plate member 1002 against the base member 1001. The base member 1001 and the plate member 1002 together compose the substrate 901.

Figure 9D:
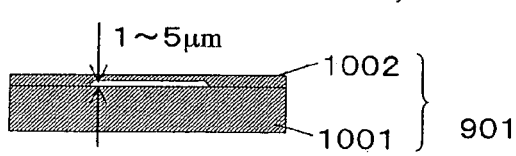

Next, by performing an optical polishing or dry etching for the surface of the plate member 1002, the plate member 1002 is made thinner until the thickness of the plate member 1002 in the region where the recess 1004 is formed is adjusted to about 3 µm (FIG. 9D). The thickness of the above region of the plate member 1002 defines the thickness of the optical waveguide 902. This thickness is preferably prescribed to be within a range of about 1 µm to about 5 µm.

After cleaning the substrate 901, a resist for electron beam lithography is applied onto the surface of the plate member 1002. By irradiating this resist with an electron beam, a resist pattern is formed. In the resist pattern, a plurality of openings which define the shapes and positions of the air holes in the photonic crystal regions 1005 are formed.

Figure 9E:
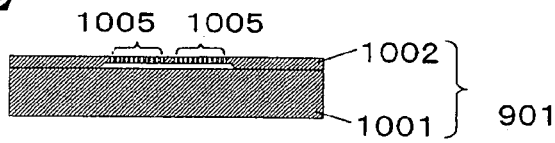

Next, by anisotropically etching the portions of the plate member 1002 that are not covered by the resist pattern, the photonic crystal regions 1005 are formed in the plate member 1002 as shown in FIG. 9E. This etching can be performed by using a chlorine-type or $SF_6$ gas, for example. The recesses 1006 are periodically arranged in the region where the optical waveguide is to be formed. The photonic crystal regions 1005 are positioned in regions other than the region where the optical waveguide 902 shown in FIG. 8A is to be formed.

Figure 9F:
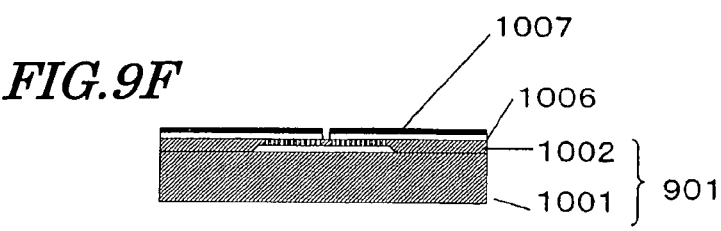

Next, as shown in FIG. 9F, a resist for use in a lift-off process (hereinafter lift-off resist") 1006 and a resist for use in an electron beam lithography process (hereinafter "EBL resist") 1007 are sequentially deposited, and thereafter an electron beam lithography is performed to form openings in regions where the refractive index compensating regions are to be formed. The lift-off resist 1006, which is intended to facilitate lift-off of a metal, also functions to bury the holes in the photonic crystal regions 105 and planarize the substrate surface.

As shown in FIG. 9G, after a metal 1008 to be thermally diffused is deposited on the EBL resist 1007, a lift-off process is performed so as to leave a patterned metal on the surface of the plate member 1002. Specifically, a resist removal solution is used to remove the lift-off resist 1006 and the EBL resist 1007.

Thereafter, for example, a heat treatment is performed at about 1000° C. for a whole day to allow the metal ions to be diffused into the plate member 1002 from the surface. The refractive index of the regions in which the metal ions have been diffused (refractive index compensating regions 903) increases relative to that of the other portions. Thus, the optical waveguide device as shown in FIG. 9H is completed.

Thus, according to the present embodiment, changes in the refractive index via thermal diffusion of a metal is utilized to form refractive index compensating regions which are periodically arranged in an optical waveguide. Although a heat treatment must be performed at a high temperature and for long hours in order to produce the refractive index compensating regions according to the present embodiment, there is no need to form periodically-arranged recesses in the optical waveguide and then fill the interiors of the recesses with another material.

Instead of changing the refractive index of the plate-like portions 1002 via thermal diffusion of a metal, a phenomenon called "photo-refractive", where light causes a change in the refractive index, may be utilized. In the case where the plate member 1002 is formed of a material which exhibits photo-refractive effects, e.g., lithium niobate, the material may be irradiated with laser light of a wavelength of 532 nm and an output power of several hundred mW, whereby the refractive index of the irradiated portions of the plate member 1002 can be changed. In the case where the refractive index compensating regions are formed through such light irradiation, there is no need to perform heat treatment at a high temperature and for long hours.

(Embodiment 3)

Hereinafter, with reference to FIGS. 10A to 10C, a third embodiment of the optical waveguide device according to the present invention will be described.

Figure 10A:
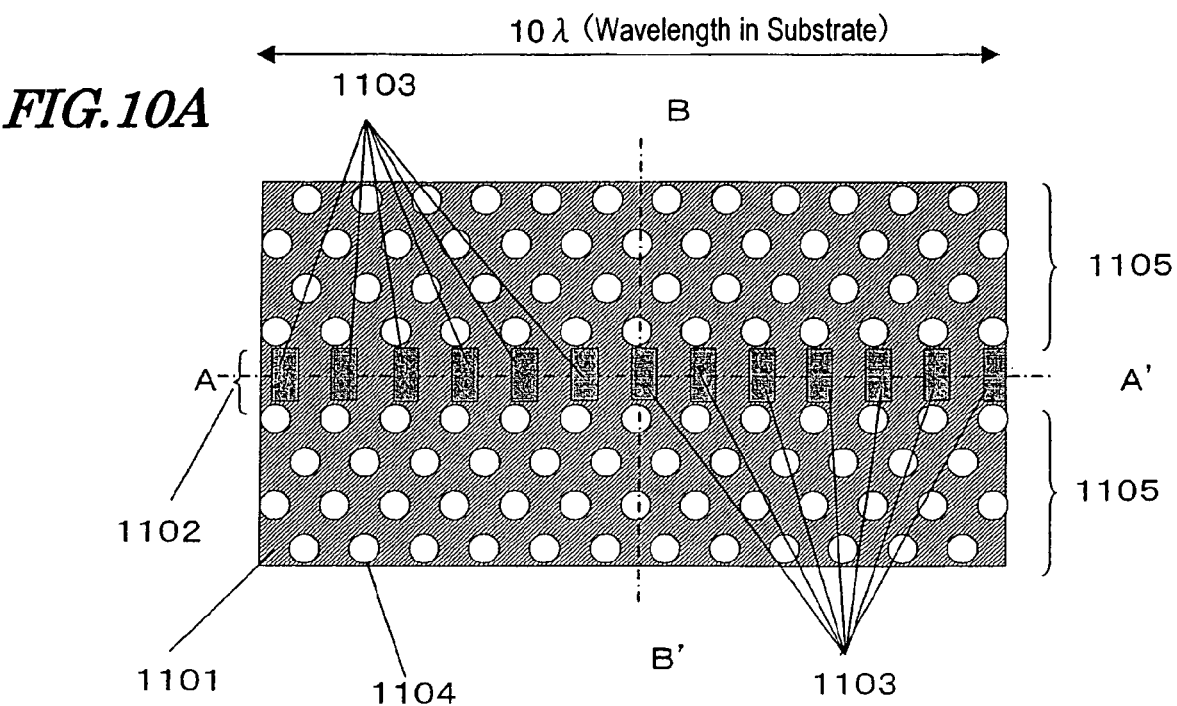
FIG. 10A is a plan view of an optical waveguide device according to Embodiment 3 of the present invention.
Figure 10B:
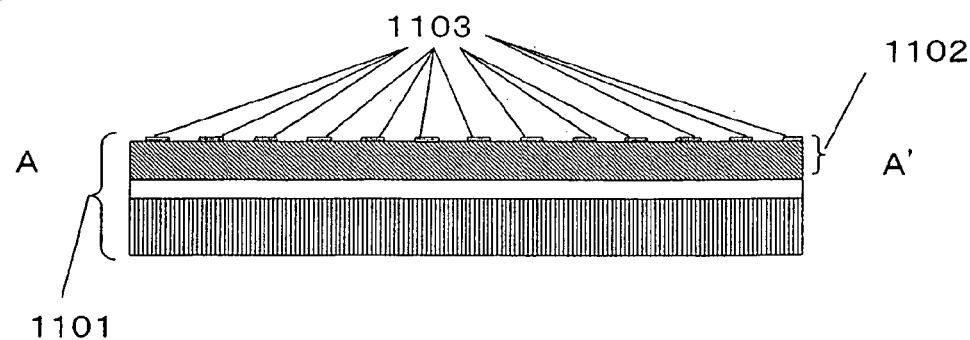
FIG. 10B is a cross-sectional view taken along line A–A'.
Figure 10C:
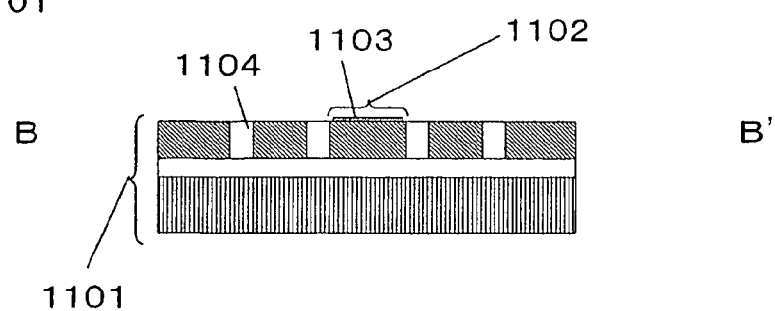
FIG. 10C is a cross-sectional view taken along line B–B'.

In the optical waveguide device of the present embodiment, as shown in FIG. 10A, two photonic crystal regions 1105 are formed, each having a periodic array of holes 1104 which have a different refractive index from the refractive index of a substrate 1101. An optical waveguide 1102 is formed at a position interposed between the two photonic crystals regions 1105.

On the surface of the optical waveguide 1102, refractive index compensating regions 1103 which are formed of a material having a different refractive index from the refractive index of the substrate 1101 are periodically arranged, along an optical waveguiding direction. The refractive index compensating regions 1103 have a function of increasing the effective refractive index of the portions of the optical waveguide 1102 positioned immediately under the refractive index compensating regions 1103.

The substrate 1101 may be formed of the same material as the material of the substrate 301 in Embodiment 1. The refractive index compensating regions 1103 are formed of a metal such as Ti, Au, Pd, Pt, Ag or Zn, or a dielectric such as SiN. Preferably, the refractive index compensating regions 1103 according to the present embodiment are formed of a metal because, when the refractive index compensating regions 1103 are formed of a metal material, it is easy to effectively adjust the effective refractive index of the portions of the optical waveguide 1102 positioned immediately under the refractive index compensating regions 1103.

In the present embodiment, too, an effective refractive index difference is created between the holes 1104 in the substrate 1101 and the substrate 1101, thus confining an optical electric field in a line defect region where the holes 1104 are not present. As shown in FIGS. 10B and 10C, it is preferable to provide an air gap underneath the optical waveguide 1102. Instead of providing the holes 1104, a photonic crystal structure can also be formed by arranging a periodic array of portions having a different refractive index from the refractive index of the substrate 1101.

In the present embodiment, the periodic changes in the effective refractive index of the optical waveguide 1102 are compensated for by the refractive index compensating regions 1103 provided on the optical waveguide 1102. As the refractive index difference between the substrate 1101 and the hole 1104 increases, a higher ability to confine an optical electric field in the optical waveguide will be obtained, but periodic changes in the effective refractive index of the optical waveguide 1102 will become more likely to occur. As mentioned earlier, such periodic changes in the effective refractive index deteriorates the transmission characteristics of the optical waveguide. This problem will be particularly outstanding when the effective refractive index difference is in a range from 2 to 0.05. Therefore, the structure of the present embodiment provides advantageous effects when the effective refractive index difference is in the range from 2 to 0.05, and provides particularly outstanding effects when the effective refractive index difference is in the range from 2 to 0.1.

Next, a production method according to the present embodiment will be described with reference to FIGS. 11A to 11G.

Figure 11A:
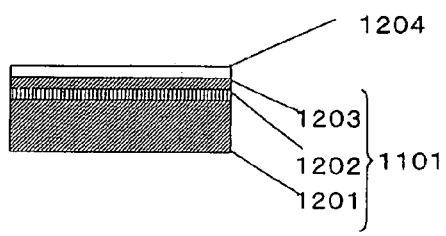
FIGS. 11A to 11G are step-by-step cross-sectional views showing a production method for the optical waveguide device of Embodiment 3.

First a substrate 1101 having an SOI (Silicon-on-insulator) structure is prepared. As shown in FIG. 11A, this substrate 1101 includes a silicon substrate 1201, an $SiO_2$ film 1202 (thickness: 1 µm) which is formed on the silicon substrate 1201, and an Si layer 1203 (thickness: 0.5 µm) which is provided on the SiO$_2$ layer 1202 (thickness: 1 µm). After the substrate 1101 is cleaned, an EBL resist 1204 is applied thereto (FIG. 11A). Through an electron beam exposure technique, the resist 1024 is patterned (FIG. 11B). In the patterned resist 1024, a plurality of openings which define the shapes and positions of the air holes in the photonic crystal regions 1105 are formed.

Figure 11F:
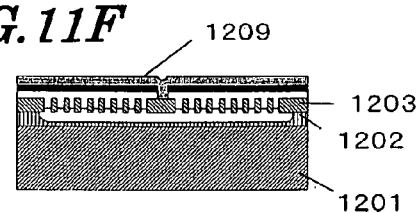
Figure 11B:
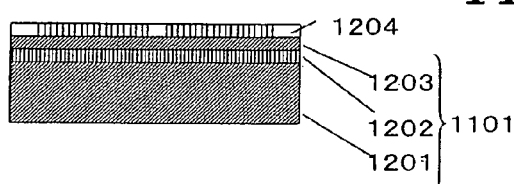
Figure 11G:
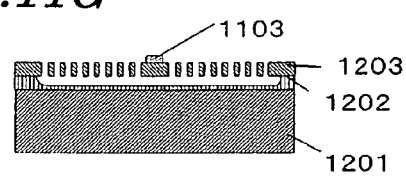
Figure 11C:
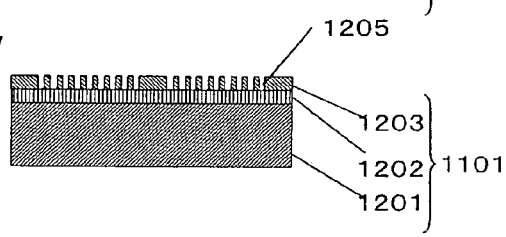

Next, by anisotropically etching the portions of the plate-like Si layer 1203 that are not covered by the patterned resist 1024, air holes 1205 which will compose the photonic crystal regions 1105 are formed in the Si layer 1203, as shown in FIG. 11C. This etching can be performed by using a chlorine-type or SF$_6$ gas, for example. The air holes 1205 are positioned in regions other than the region where the optical waveguide is to be formed. The air holes 1205 penetrate the Si layer 1203 and reach the SiO$_2$ layer 1202.

Figure 11D:
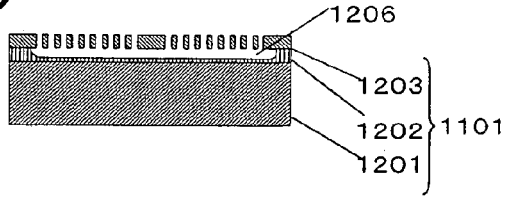
Figure 11E:
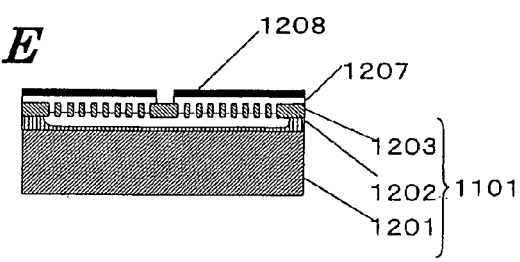

Thereafter, by partially removing the SiO$_2$ layer 1202 with hydrofluoric acid, an air gap 1206 as shown in FIG. 11D is formed. Then, as shown in FIG. 11E, a lift-off photoresist 1207 and an EBL resist 1208 are layered on the substrate surface, and thereafter a mask for patterning a metal to be mounted on the optical waveguide.

As shown in FIG. 11F, after vapor-depositing a metal 1209 such as Zn, Ti or Au from over the mask, a resist removal solution is used to remove the lift-off photoresist 1207 and the EBL resist 1208. Thus, as shown in FIG. 11G, the refractive index compensating regions 1103 composed of the metal 1209 are formed on the optical waveguide, whereby the optical waveguide device of the present embodiment is completed.

Note that, in accordance with the optical waveguide devices of Embodiments 2 and 3, the changes in the refractive index which are introduced by the refractive index compensating regions are milder than those obtained in Embodiment 1, and therefore the aforementioned effect of controlling the flow of optical energy will be smaller. As a result, the relationship between the shapes and positions of the refractive index compensating regions and the transmission characteristics will be different from that obtained with the optical waveguide device of Embodiment 1. This point will be described below.

EXAMPLE 2

Figure 12A:
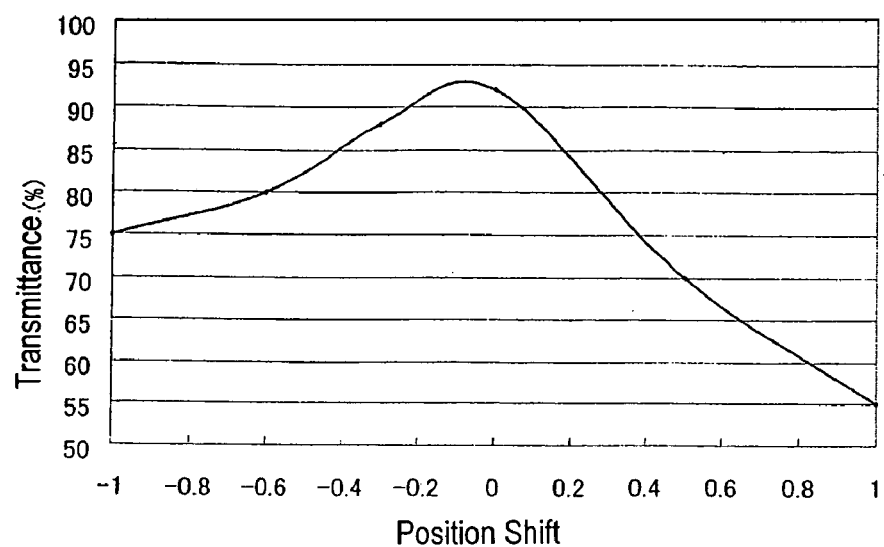
FIG. 12A is a graph showing a relationship between position shifts in the refractive index compensating regions and optical waveguide transmittance in Example 2.
Figure 12B:
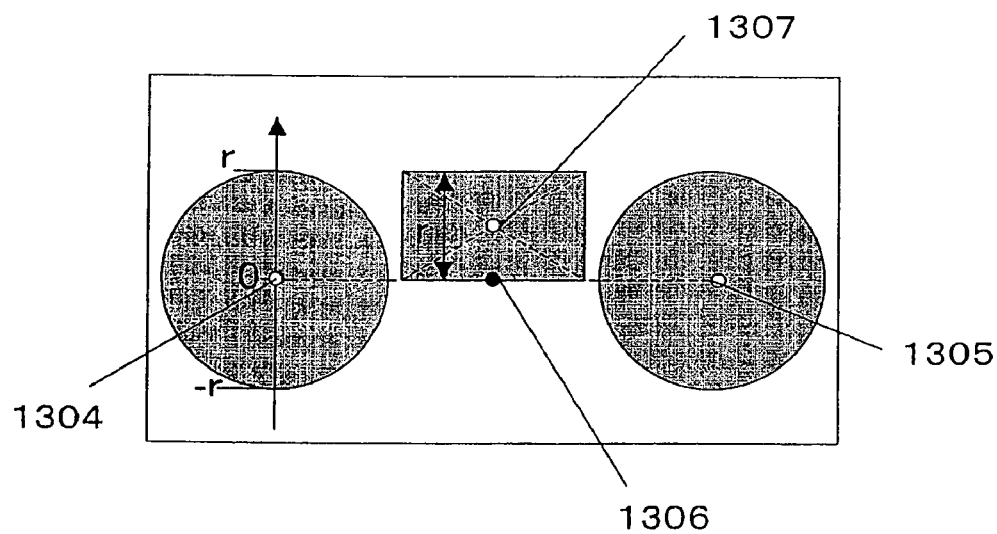
FIG. 12B is a plan view schematically showing the positioning of a refractive index compensating region.

FIG. 12A is a graph showing a relationship between position shift amounts of the refractive index compensating regions 1103 and the transmission characteristics in the case where the refractive index compensating regions 1103 are formed of gold (Au). FIG. 12B is a plan view showing a position shift of a refractive index compensating region. The horizontal axis of the graph of FIG. 12A represents the position shift amount of each refractive index compensating region. The position shift amount indicates how much and in which direction the center of gravity 1307 of each refractive index compensating region is shifted relative to the midpoint position 1306 of a line segment interconnecting the centers 1304 and 1305 of two opposing air holes sandwiching the optical waveguide. In the case where the position is shifted in a direction opposite to the optical waveguiding direction, the "–" symbol is added before the position shift amount.

As will be clear from the graph of FIG. 12A, the transmittance exhibits the highest value when the position shift amount is about 0.1 in a direction opposite to the optical waveguiding direction, i.e., when the position of the center of gravity of each refractive index compensating region 1103 is shifted by about –0.1 r in the optical waveguiding direction. The reason is that, in the structure of the present example, the refractive index compensating regions provide a smaller effect of controlling the flow of optical energy.

It is desirable that the distance from the midpoint 1306 of a line segment interconnecting the centers 1304 and 1305 of the two adjoining air holes to the center of gravity 1307 of the refractive index compensating region is in a range from –0.5 r to 0.25 r, more desirably in a range from –0.45 r to 0.25 r, and even more desirably in a range from –0.2 r to 0.1 r.

By using the optical waveguide device according to the present invention, it is possible to realize an optical device (e.g., an optical modulator) which is small and has little optical loss.

The optical waveguide device according to the present invention can also be used as a light-emitting diode or as an optical waveguide portion of a semiconductor light-emitting device such as a laser diode. In such usages, it is possible to reduce the transmission loss in the optical waveguide portion, and provide enhanced characteristics.

Thus, the optical waveguide device according to the present invention can be applied to an optical communication system to realize a reduction in its size and an increase in its efficiency.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical waveguide device comprising: a plurality of photonic crystal regions, each having holes arranged in a periodic array; and
   an optical waveguide formed between the photonic crystal regions, wherein,
   among the plurality of holes contained in the photonic crystal regions, a plurality of holes adjoining the optical waveguide on both sides of the optical waveguide are symmetrically arrayed with respect to a center axis which extends along a waveguiding direction of the optical waveguide;
   the optical waveguide includes a plurality of first portions each composed of a first material and a plurality of second portions each composed of a second material;
   the plurality of first portions and the plurality of second portions are periodically arranged along the waveguiding direction of the optical waveguide;
   each of the plurality of second portions is generally interposed between a pair of holes which are in symmetric positions with respect to the center axis;
   the first material is LiNbO$_3$, LiTaO$_3$, or KTiOPO$_4$;
   the second material has an effective refractive index which is higher than an effective refractive index of the first material; and
   the center of gravity of every second portion is shifted along the waveguiding direction from a midpoint of a line interconnecting centers of the pair of holes sandwiching the second portion, and is located between a position which is 0.45 r away from the midpoint in the waveguiding direction and a position which is 0.25 r away from the midpoint in a direction opposite to the waveguiding direction, where r is a radius of each hole.

2. The optical waveguide device of claim 1, wherein an array period of the plurality of second portions is equal to an array period of the holes in the plurality of photonic crystal regions.

3. The optical waveguide device of claim 1, wherein the plurality of photonic crystal regions and the optical waveguide are formed on a substrate.

4. The optical waveguide device of claim 3, wherein,
at least a surface region of the substrate is formed of the first material.

5. The optical waveguide device of claim 4, wherein the second material composing the plurality of second portions fills holes formed in the substrate.

6. The optical waveguide device of claim 1, wherein the second material contains a simple substance, alloy, or compound of at least one type of metal selected from the group consisting of Ga, Si, Al, Ga, Nb, Ta, Ti, Zn, Au, Pt, Ni, and Ge.

7. The optical waveguide device of claim 6, wherein the metal compound is a compound of: at least one type of element selected from the group consisting of phosphorus, nitrogen, oxygen, and arsenic; and the metal.

8. The optical waveguide device of claim 1, wherein,
the substrate is formed of $LiNbO_3$; and
the plurality of second portions are formed of AlN.

9. The optical waveguide device of claim 1, wherein,
the substrate is formed of $LiNbO_3$; and
the plurality of second portions are formed of $Nb_2O_5$.

10. The optical waveguide device of claim 1, wherein the plurality of second portions are formed of modified portions of the substrate.

11. The optical waveguide device of claim 10, wherein the modified portions of the substrate are portions of the substrate where a metal element is diffused.

12. The optical waveguide device of claim 1, wherein,
the substrate has: a plate member, including the plurality of photonic crystal regions and the optical waveguide; and
a base member supporting the plate member; and
the holes are throughholes penetrating the plate member.

13. The optical waveguide device of claim 10, wherein an air gap is provided between the plate member and the base member.

* * * * *